United States Patent
Itoh et al.

(10) Patent No.: US 9,115,420 B2
(45) Date of Patent: Aug. 25, 2015

(54) THERMOELECTRIC MATERIAL FORMED OF MG₂SI-BASED COMPOUND AND PRODUCTION METHOD THEREFOR

(75) Inventors: Takashi Itoh, Nagoya (JP); Kento Hagio, Nagoya (JP)

(73) Assignees: HITACHI CHEMICAL COMPANY, LTD., Tokyo (JP); NATIONAL UNIVERSITY CORPORATION NAGOYA UNIVERSITY, Nagoya-shi, Aichi (JP)

( * ) Notice: Subject to any disclaimer, the term of this patent is extended or adjusted under 35 U.S.C. 154(b) by 953 days.

(21) Appl. No.: 13/317,848

(22) Filed: Oct. 31, 2011

(65) Prior Publication Data

US 2012/0114517 A1  May 10, 2012

(30) Foreign Application Priority Data

Nov. 8, 2010 (JP) ................................. 2010-249891

(51) Int. Cl.
| | |
|---|---|
| C22C 23/00 | (2006.01) |
| C22C 23/02 | (2006.01) |
| B22F 3/14 | (2006.01) |
| C04B 35/58 | (2006.01) |
| C04B 35/626 | (2006.01) |
| C04B 35/645 | (2006.01) |
| C22C 1/04 | (2006.01) |
| C22C 1/05 | (2006.01) |

(52) U.S. Cl.
CPC . *C22C 23/02* (2013.01); *B22F 3/14* (2013.01); *C04B 35/58085* (2013.01); *C04B 35/6262* (2013.01); *C04B 35/62665* (2013.01); *C04B 35/645* (2013.01); *C22C 1/0491* (2013.01); *C22C 1/058* (2013.01); *C04B 2235/40* (2013.01); *C04B 2235/401* (2013.01); *C04B 2235/402* (2013.01); *C04B 2235/405* (2013.01); *C04B 2235/407* (2013.01); *C04B 2235/428* (2013.01); *C04B 2235/5436* (2013.01); *C04B 2235/6567* (2013.01); *C04B 2235/666* (2013.01); *C04B 2235/81* (2013.01)

(58) Field of Classification Search
USPC .............................. 75/249; 420/402; 136/200
See application file for complete search history.

(56) References Cited

U.S. PATENT DOCUMENTS

| | | | |
|---|---|---|---|
| 2005/0089435 A1* | 4/2005 | Kondoh | 419/19 |
| 2010/0051081 A1* | 3/2010 | Iida et al. | 136/240 |
| 2012/0118343 A1 | 5/2012 | Iida et al. | |

FOREIGN PATENT DOCUMENTS

| | | |
|---|---|---|
| EP | 2 461 384 A1 | 6/2012 |
| JP | 2002-285274 A | 10/2002 |
| JP | 2006-128235 A | 5/2006 |
| JP | 2011-049538 A | 3/2011 |
| WO | WO 2011/013609 A1 | 2/2011 |

OTHER PUBLICATIONS

Japanese Office Action dated Jul. 1, 2014 with a partial English translation thereof.
German Office Action dated Apr. 23, 2015.
Friedrich, H. E., et al. "Magnesium Technology", Metallurgy, Design Data, Applications. Berlin, Heidelberg: Springer-Verlag, 2006. S. 207, 472,474-ISBN 3-540-20599-3.

* cited by examiner

*Primary Examiner* — George Wyszomierski
*Assistant Examiner* — Ngoclan T Mai
(74) *Attorney, Agent, or Firm* — McGinn IP Law Group, PLLC (57) ABSTRACT

A thermoelectric material (and a method for producing the same) is essentially formed of an Mg₂Si-based compound represented by the chemical formula $Mg_{2-x-y-z}Al_xZn_yMn_zSi$ ($x \neq 0$, $y \neq 0$, $z \neq 0$, $0.04 \leq y/x \leq 0.6$, and $0.013 \leq z/x \leq 0.075$) wherein the total amount of Al, Zn, and Mn is 0.3 at % to 5 at %. $Mg_{2-x-y-z}Al_xZn_yMn_z$ is provided in the form of an Mg alloy.

4 Claims, 8 Drawing Sheets

THERMOELECTRIC MATERIAL FORMED OF MG₂SI-BASED COMPOUND AND PRODUCTION METHOD THEREFOR

BACKGROUND OF THE INVENTION

1. Field of the Invention

The present invention relates to a thermoelectric material essentially formed of an $Mg_2Si$-based compound, and to a method for producing the thermoelectric material. More particularly, the present invention relates to a thermoelectric material essentially formed of an $Mg_2Si$-based compound synthesized from an Mg alloy containing Al, Zn, and Mn, which serve as alloy components and also as dopant elements; and to a method for producing the thermoelectric material, the method employing the liquid-solid phase reaction process in combination with sintering.

2. Background Art

Hitherto, there have been known thermoelectric conversion devices realizing conversion between thermal energy and electric energy. A thermoelectric module of such a device has a structure in which two types (P-type and N-type) of thermoelectric material (thermoelectric conversion materials) elements are connected in series electrically and arranged in parallel thermally. In such a thermoelectric module, when a difference in temperature is provided between two terminals, holes and electrons migrate respectively in the P-type and N-type materials on the basis of the Seebeck effect, whereby electromotive force is generated between the two terminals.

The figure of merit (Z:1/K) of a thermoelectric material is calculated by the following formula:

$$Z = \alpha^2/(\rho\kappa)$$

(wherein $\rho$ represents electrical resistivity ($\Omega\cdot m$), $\alpha$ represents Seebeck coefficient (V/K), and $\kappa$ represents thermal conductivity (W/mK)).

Attempts have been made to utilize the aforementioned phenomenon in devices for power generators making use of waste heat discharged from various heat generating systems. Also, attempts have been made to utilize waste heat from automobile engines for power generation, since a considerably large amount of waste heat is discharged from automobile engines.

Hitherto, $Bi_2Te_3$, PbTe, or the like has been put into practice as a thermoelectric material for forming a thermoelectric conversion device. However, the element Bi, Te, or Pb, which forms such a thermoelectric material, has high toxicity, and thus may cause environmental pollution. Therefore, demand has arisen for a thermoelectric material having reduced environmental burden (i.e., a thermoelectric material having no toxicity). Also, demand has arisen for a lightweight, resourceful thermoelectric material, from the viewpoint that the material is used for recovery of waste heat from automobiles.

$Mg_2Si$ (specific weight: about 2) has been known as a nontoxic, lightweight N-type thermoelectric material for use under mid to high temperature. For improvement of its thermoelectric performance, $Mg_2Si$ is doped with a dopant. Known dopants added to $Mg_2Si$ include an element which provides $Mg_2Si$ with N-type semiconductor properties, such as Al or Sb, and an element which provides $Mg_2Si$ with P-type semiconductor properties, such as Ag or Cu. However, since Mg is an active metal and may cause the risk of, for example, ignition, $Mg_2Si$ thermoelectric materials have been less developed.

One method for producing such an $Mg_2Si$-based compound is based on the direct melting process. Specifically, a powder mixture of Mg powder and Si powder (atomic ratio of Mg:Si=2:1) and powder of a dopant element, or a powder mixture of preliminarily produced $Mg_2Si$ powder and powder of a dopant element is heated to a temperature equal to or higher than the melting point of $Mg_2Si$ (1,085° C.), and subsequently an $Mg_2Si$-based compound is produced under cooling. However, in this production method, a high-pressure inert gas must be loaded for suppressing evaporation of Mg, high cost is required for, for example, apparatuses or production steps, and the risk of explosion of Mg may be involved during heating. In addition, segregation of Mg or Si is likely to occur, and thus the resultant product may have a non-uniform composition (i.e., a difference in shrinkage between a center portion of the product and a portion thereof at the vicinity of a crucible), resulting in occurrence of cracking in the product.

In another method for producing an $Mg_2Si$-based compound, a powder mixture of Mg powder and Si powder (atomic ratio of Mg:Si=2:1) and powder of a dopant element, or a powder mixture of preliminarily produced $Mg_2Si$ powder and powder of a dopant element is placed into a carbon crucible contained in a pressurized container filled with an inert gas, and the powder mixture is melted through high-frequency heating. However, similar to the case of the method employing the direct melting process, cracking may occur in a product produced through the method involving high-frequency heating. In addition, the method involving high-frequency heating possesses a problem in that high cost is required for producing a product of interest, since an expensive heating apparatus is employed, and the method per se is not suitable for large-scale production.

Yet another method for producing an $Mg_2Si$-based compound employs the mechanical alloying process. In this method, Mg powder and Si powder are weighed so that the atomic ratio of Mg to Si is adjusted to 2:1, and these powders are milled by means of iron or ceramic balls for a long period of time (e.g., 300 h), to thereby mechanically synthesize $Mg_2Si$ powder. The thus-synthesized $Mg_2Si$ powder is mixed with a dopant element, and the mixture is thermally treated, to thereby produce an $Mg_2Si$-based compound. In the production method employing the mechanical alloying process, conceivably, balls may be ground through long-term mixing and milling, and the resultant alloy powder may be contaminated with components of the balls (i.e., impurities), resulting in low purity of the powder. In addition, there must be taken into consideration the risk of explosion of Mg powder, which would otherwise occur when the powder is removed from a pot.

Still another method for producing an $Mg_2Si$-based compound employs the discharge plasma process. In this method, Mg powder and Si powder (atomic ratio of Mg to Si=2:1) are mixed with powder of a dopant element; the resultant powder mixture is heated and retained at a temperature of 650° C. (melting point of Mg) to 800° C. for a specific period of time, to thereby form $Mg_2Si$ through reaction of molten Mg and Si particles, while the dopant element is dissolved in molten Mg so as to form a solid solution through substitution of the dopant element for a portion of Mg or Si contained in an $Mg_2Si$ crystal structure, to thereby produce an $Mg_2Si$-based compound having a non-equilibrium composition.

As a technique relating to this production method, for example, Japanese Patent Application Laid-Open (kokai) No. 2002-285274 proposes an invention relating to "Mg—Si-based thermoelectric material and production method therefor". This patent document discloses that an Mg—Si-based thermoelectric material is produced through a method including a step of mixing Mg powder and Si powder (atomic ratio of Mg to Si=2:1) with powder of a dopant element; a step of heating the powder mixture obtained through the mixing step at a temperature of Tm (melting point of Mg) to 1073 K for a specific period of time, to thereby form $Mg_2Si$ through reaction of molten Mg and Si particles, while dissolving the dopant element in molten Mg so as to form a solid solution through substitution of the dopant element for a portion of Mg or Si contained in the aforementioned $Mg_2Si$ crystal structure, to thereby produce an $Mg_2Si$-based compound; and a cooling step for stopping the heating step after the elapse of the aforementioned specific period of time so that unreacted Si particles remain.

Meanwhile, Japanese Patent Application Laid-Open (kokai) No. 2006-128235 discloses that an $Mg_2Si$-based compound is melted and doped with two dopant elements (Al and Zn) in an inert gas, to thereby synthesize an N-type thermoelectric semiconductor; and the semiconductor is crushed and then sintered by spark plasma sintering. The invention disclosed in this patent document overcomes problems in that doping of only Al causes considerable segregation, and doping of only Zn forms a P-type thermoelectric semiconductor, but fails to form an N-type thermoelectric semiconductor. This patent document describes that the total amount of the dopant elements Al and Zn is 0.21 at % to 2 at %.

The method disclosed in Japanese Patent Application Laid-Open (kokai) No. 2002-285274 can produce products of uniform quality and keep safety in manufacturing, and thus is useful for improvement of the thermoelectric performance of a product of interest and for reducing production cost, as compared with any of the aforementioned other production methods. However, there is still a question regarding the necessity of the cooling step for stopping heating so that unreacted Si particles remain.

Japanese Patent Application Laid-Open (kokai) No. 2002-285274 also discloses an $Mg_2Si$-based compound represented by the chemical formula $Mg_{66.667-x}Si_{33.333-y}A_{x+y}$ (wherein A represents any dopant element selected from among Al, P, Ga, As, In, Sb, Ag, Cu, Au, Ni, Fe, Mn, Co, Zn, and Pb; and $0.017 \leq x \leq 0.192$ and y=0, or x=0 and $0.017 \leq y \leq 0.192$). However, in the Examples of this patent document, the material used for forming the compound is limited only to MgAlSi, and materials other than MgAlSi are not described. Thus, Japanese Patent Application Laid-Open (kokai) No. 2002-285274 does not suggest a thermoelectric material formed of $Mg_{2-x-y-z}Al_xZn_yMn_zSi$ (i.e., an $Mg_2Si$-based compound doped with a specific combination of the three elements Al, Zn, and Mn). The $Mg_2Si$-based compound disclosed in this patent document is doped with only a single dopant element (0.017 at % to 0.192 at %).

The method disclosed in Japanese Patent Application Laid-Open (kokai) No. 2006-128235 realizes production of $Mg_2Si$ devices of uniform quality with reduced segregation. However, this method still fails to overcome a problem in terms of the performance deterioration of an $Mg_2Si$ device in air at high temperature. In addition, Japanese Patent Application Laid-Open (kokai) No. 2006-128235 discloses only an MgAlZnSi compound wherein the total amount of Al and Zn added is 0.21 at % to 2 at %, and does not suggest a thermoelectric material formed of $Mg_{2-x-y-z}Al_xZn_yMn_zSi$.

SUMMARY OF THE INVENTION

The present invention has been made in light of the aforementioned situations.

An object of the present invention is to provide a thermoelectric material essentially formed of a novel compound exhibiting high thermoelectric conversion performance.

Another object of the present invention is to provide a method for producing a thermoelectric material, which method employs the liquid-solid phase reaction process realizing synthesis at a relatively low temperature, which can improve the safety of production processes, and which can reduce production cost.

Yet another object of the present invention is to provide a method for producing a thermoelectric material which is essentially formed of an $Mg_2Si$-based compound containing, as dopant elements, Al, Zn, and Mn derived from an Mg alloy, which has excellent thermoelectric performance, and which exhibits the effect of reducing deterioration of thermoelectric performance in air at high temperature.

Still another object of the present invention is to provide a method for producing a thermoelectric material by recycling cut chips generated during machining of an Mg alloy employed for casting (e.g., die casting).

In a first aspect of the present invention, there is provided a thermoelectric material essentially formed of an $Mg_2Si$-based compound represented by the chemical formula $Mg_{2-x-y-z}Al_xZn_yMn_zSi$ ($x \neq 0$, $y \neq 0$, $z \neq 0$) wherein the total amount of Al, Zn, and Mn is 0.3 at % to 5 at %. The thermoelectric material essentially made of such an $Mg_2Si$-based compound has not been known; i.e., the thermoelectric material is a novel thermoelectric material. An N-type thermoelectric semiconductor can be produced from the thermoelectric material of the present invention.

In the present invention, $Mg_{2-x-y-z}Al_xZn_yMn_zSi$ may also be represented as $Mg_{66.667-X-Y-Z}Al_XZn_YMn_ZSi_{33.333}$. Therefore, the expression "the total amount of Al, Zn, and Mn is 0.3 at % to 5 at % in $Mg_{2-x-y-z}Al_xZn_yMn_zSi$" corresponds to the expression "$0.3 \leq X+Y+Z \leq 5$ in $Mg_{66.667-X-Y-Z}Al_XZn_YMn_ZSi_{33.333}$". Since x is 3X/100, y is 3Y/100, and z is 3Z/100, the relation $0.3 \leq X+Y+Z \leq 5$ corresponds to the relation $0.009 \leq x+y+z \leq 0.15$.

In the present invention, preferably, x, y, and z of $Mg_{2-x-y-z}Al_xZn_yMn_zSi$ satisfy the following relations: $0.04 \leq y/x \leq 0.6$ and $0.013 \leq z/x \leq 0.075$. Preferably, $Mg_{2-x-y-z}Al_xZn_yMn_z$ which forms the compound with Si is provided in the form of an Mg alloy.

In a second aspect of the present invention, there is provided a method for producing a thermoelectric material essentially formed of an $Mg_2Si$-based compound, the method comprising:

mixing an Mg alloy with Si powder so that the atomic ratio of Mg alloy to Si is adjusted to 2:1;

allowing the Mg alloy to react with Si through the liquid-solid phase reaction process in an inert gas atmosphere at a temperature equal to or higher than the melting point of the Mg alloy, while the Mg alloy in liquid state coexists with Si in solid state;

cooling the resultant product after completion of reaction, to thereby produce a porous $Mg_2Si$-based compound;

crushing the $Mg_2Si$-based compound in an inert gas atmosphere; and pressure-sintering the thus-crushed product under vacuum or in an inert atmosphere.

A characteristic feature of the method of the present invention resides in that when an $Mg_2Si$-based compound is produced by the liquid-solid phase reaction process, dopant elements are provided in the form of an Mg alloy. The $Mg_2Si$-based compound produced in the present invention is represented by the chemical formula $Mg_{2-x-y-z}Al_xZn_yMn_zSi$ ($x \neq 0$, $y \neq 0$, $z \neq 0$), wherein the total amount of Al, Zn, and Mn is 0.3 at % to 5 at %. In consideration of the case where only a main Mg alloy containing Al, Zn, and Mn is employed in liquid state, as well as the case where the alloy is mixed and diluted with Mg and employed in liquid state, the total amount of Al, Zn, and Mn is determined so as to fall within a range of 0.3 at % to 5 at %. Conceivably, when the total amount of Al, Zn, and Mn falls within this range, as described hereinbelow, the resultant thermoelectric material exhibits a dimensionless figure of merit higher than that of a conventional thermoelectric material.

Preferably, x, y, and z of the chemical formula $Mg_{2-x-y-z}Al_xZn_yMn_zSi$ satisfy the following relations: $0.04 \leq y/x \leq 0.6$ and $0.013 \leq z/x \leq 0.075$. The Mg alloy employed in the present invention may be an Mg alloy containing Mg, Al, Zn, and Mn as essential constituent elements. In consideration of the case where at least a main Mg alloy containing Al, Zn, and Mn is employed, the compositional proportions of Al, Zn, and Mn are determined so as to satisfy the following relations: $0.04 \leq y/x \leq 0.6$ and $0.013 \leq z/x \leq 0.075$. Conceivably, when the compositional proportions of Al, Zn, and Mn satisfy these relations, as described hereinbelow, the resultant thermoelectric material exhibits a dimensionless figure of merit higher than that of a conventional thermoelectric material.

The Mg alloy employed in the present invention may be an Mg alloy containing Al in an amount of 5.5 wt. % to 7.2 wt. %, Zn in an amount of 0.5 wt. % to 1.5 wt. %, and Mn in an amount of 0.15 wt. % to 0.4 wt. %. This Mg alloy is known as AZ61 to those skilled in the art. Alternatively, the Mg alloy employed in the present invention may be an Mg alloy containing Al in an amount of 2.5 wt. % to 3.5 wt. %, Zn in an amount of 0.6 wt. % to 1.4 wt. %, and Mn in an amount of 0.20 wt. % to 1.0 wt. %. This Mg alloy is known as AZ31B alloy to those skilled in the art.

Preferably, the Mg alloy employed is an Mg alloy containing Al in an amount of 5.5 wt. % to 7.2 wt. %, Zn in an amount of 0.5 wt. % to 1.5 wt. %, and Mn in an amount of 0.15 wt. % to 0.4 wt. %, and, during mixing of the Mg alloy with Si powder, the Mg alloy is further mixed with Mg powder so that the amount of the Mg alloy is adjusted to 20 wt. % or more and less than 100 wt. % with respect to the total amount of the Mg alloy and the Mg powder (the amount of the Mg alloy is 100 wt. % in the case where no Mg powder is employed). In this case, the dimensionless figure of merit (ZT) of the thus-produced $Mg_{2-x-y-z}Al_xZn_yMn_zSi$ can be increased, as compared with that of the conventional thermoelectric material disclosed in Japanese Patent Application Laid-Open (kokai) No. 2002-285274 or 2006-128235. Preferably, the Mg alloy is mixed with Mg powder so that the amount of the Mg alloy is adjusted to 50 wt. % or more with respect to the total amount of the Mg alloy and the Mg powder.

During mixing of the Mg alloy with Si powder, the Mg alloy may be further mixed with a second Mg alloy containing, as essential components, Mg, Al, Zn, and Mn in proportions different from those of the Mg alloy, or mixed with Mg powder. In this case, the compositional proportions of Mg, Al, Zn, and Mn of the resultant $Mg_{2-x-y-z}Al_xZn_yMn_zSi$ can be adjusted.

No particular limitation is imposed on the form of the Mg alloy employed in the present invention. However, preferably, the Mg alloy mixed with Si powder is in the form of powder or numerous finely cut chips. In this case, the Mg alloy can be uniformly mixed with Si powder, and the composition of the resultant $Mg_{2-x-y-z}Al_xZn_yMn_zSi$ can be made uniform.

Preferably, the crushed product is subjected to sieve classification before pressure-sintering, to thereby remove unreacted Mg alloy. In this case, the composition of the resultant $Mg_{2-x-y-z}Al_xZn_yMn_zSi$ can be made uniform.

Pressure-sintering of the crushed product may be carried out by the spark plasma sintering process, in which voltage/current is applied to the crushed $Mg_2Si$-based compound, and a sintered product is produced through a discharge phenomenon which occurs between particles of the crushed compound. This process can effectively produce $Mg_2Si$-based compounds of uniform quality.

The $Mg_2Si$-based compound of the present invention, which is represented by $Mg_{2-x-y-z}Al_xZn_yMn_zSi$ ($x \neq 0$, $y \neq 0$, $z \neq 0$) and in which the total amount of Al, Zn, and Mn is 0.3 at % to 5 at %, exhibits, at 500° C., a dimensionless figure of merit (ZT) about four times that of a conventional $Mg_2Si$-based compound (i.e., $Mg_2Si$, $Mg_{2-x}Al_xSi$, or $Mg_{2-x-y}Al_xZn_ySi$). Also, the $Mg_2Si$-based compound of the present invention exhibits reduced deterioration of thermoelectric performance in air at high temperature. Therefore, the $Mg_2Si$-based compound is very useful as a thermoelectric material.

According to the production method of the present invention, since the liquid-solid phase reaction process is carried out in combination with pressure-sintering, the safety of production processes can be improved, and production cost can be reduced. In addition, since the production method employs, as a raw material, an Mg alloy containing Al, Zn, and Mn, the method can produce a thermoelectric material essentially formed of an $Mg_2Si$-based compound thermoelectric semiconductor which has excellent figure of merit and exhibits reduced deterioration of thermoelectric performance in air at high temperature.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The present invention will next be described in detail by way of examples, which should not be construed as limiting the invention thereto.

Figure 1:
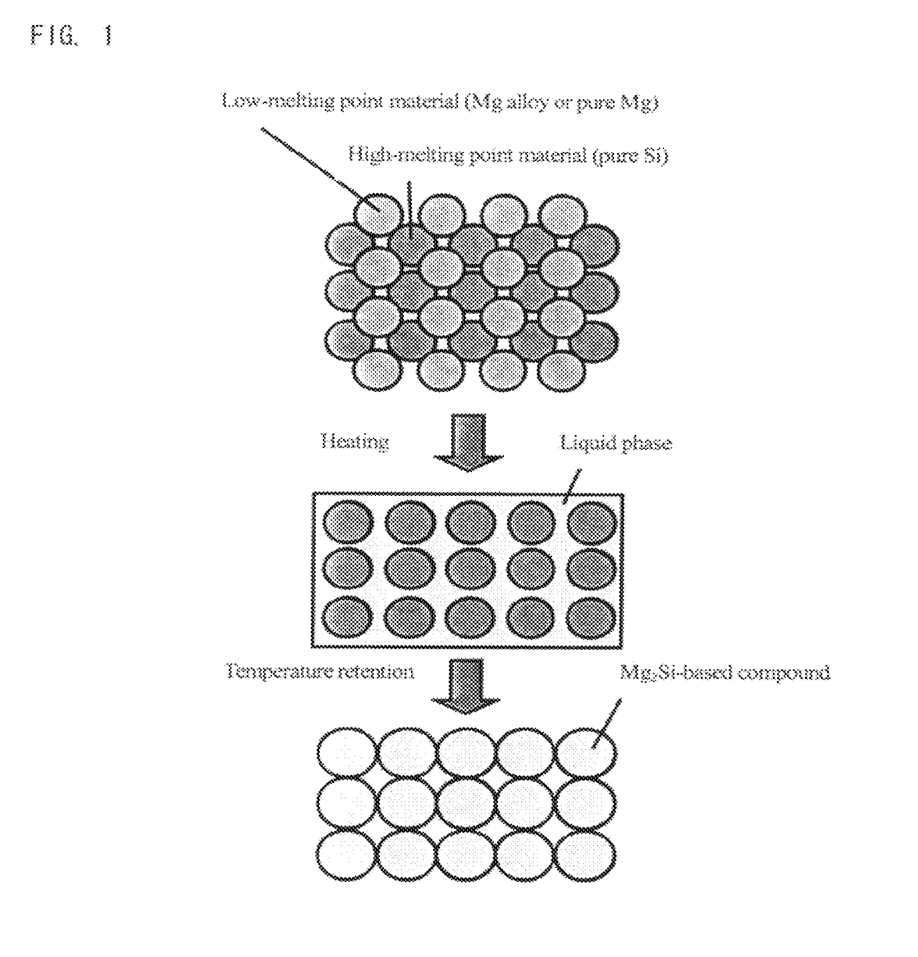
FIG. 1 schematically shows the liquid-solid phase reaction process employed in the present invention.

FIG. 1 schematically shows the liquid-solid phase reaction process employed for carrying out the present invention. This process realizes synthesis of an $Mg_2Si$-based compound under such conditions that when two or more raw materials are employed, and the melting point of a main component material is lower than that of the other material(s), in a solid-liquid coexistence state at a temperature equal to or higher than the melting point of the main component material, diffusion reaction occurs actively at the solid-liquid interface. Among the raw materials employed in the present invention, an Mg alloy or pure Mg (i.e., main component) has a lower melting point, and pure Si has a higher melting point. Therefore, when these materials are in a solid-liquid coexistence state, diffusion reaction occurs actively at the solid-liquid interface. Thus, the liquid-solid phase reaction process is suitable for synthesis of an $Mg_2Si$-based compound. In addition, since this process realizes synthesis of the compound at a relatively low temperature within a short period of time, production cost can be reduced.

When an $Mg_2Si$-based compound represented by the chemical formula $Mg_{2-x-y-z}Al_xZn_yMn_zSi$ is synthesized through the liquid-solid phase reaction process employed in the present invention, preferably, cut chips of an Mg alloy containing Al, Zn, and Mn and pure Mg powder or cut chips of a different Mg alloy are mixed with pure Si powder so that the total amount of Al, Zn, and Mn is adjusted to 0.3 at % to 5 at %, y/x is adjusted to 0.04 to 0.6, and z/x is adjusted to 0.013 to 0.075. No particular limitation is imposed on the form of such an Mg alloy, and the Mg alloy may be provided in the form of powder. Generally, such an Mg alloy mixed with Mg powder (for adjustment of compositional proportions) and Si powder is preferably provided in the form of, for example, powder or fine cut chips, from the viewpoint of facilitating uniform reaction of the Mg alloy with Si particles in solid state.

In the present invention, a porous $Mg_2Si$-based compound synthesized through the liquid-solid phase reaction process is crushed and then subjected to particle size classification by sieving. This process is effective for adjustment of the particle size of the synthesized compound and also for separation/removal of unreacted residual Mg alloy.

The $Mg_2Si$-based compound powder obtained through post-synthesis crushing and particle size classification is subjected to spark plasma sintering for a short period of time, to thereby produce a sintered $Mg_2Si$-based compound. The sintered $Mg_2Si$-based compound is a dense $Mg_2Si$-based compound semiconductor in which no macrosegregation occurs.

Example 1

(Production of Thermoelectric Material)

Figure 2:
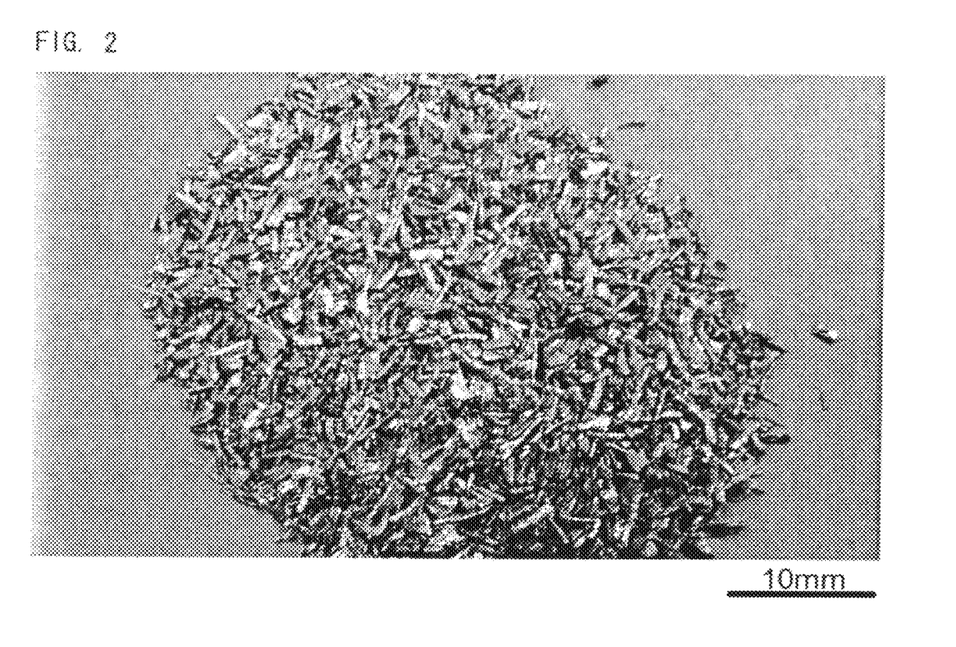
FIG. 2 is a photograph showing the form of cut chips of an AZ61 Mg alloy employed in the production method of the present invention.

The $Mg_2Si$-based compound of the present invention contains, as essential constituent elements, Mg, Si, and three main dopant elements (i.e., Al, Zn, and Mn), and is represented by the chemical formula $Mg_{2-x-y-z}Al_xZn_yMn_zSi$. In Example 1, there were provided, as starting materials, Mg powder (purity: 99.9%, particle diameter: <180 µm), Si powder (purity: 99.9%, particle diameter: <75 µm), and cut chips of an AZ61 Mg alloy (FIG. 2) having an alloy composition described in Table 1 shown below. Cut chips of the AZ61 Mg alloy were mixed with Mg powder so that the AZ61 Mg alloy content was adjusted to 0, 20, 50, 80, or 100 wt. % (Mg powder: balance). The thus-prepared Mg-based raw material (i.e., mixture of Mg powder and the Mg alloy) and Si powder were weighed and mixed together in an Ar atmosphere so that the atomic ratio of the Mg-based raw material to Si was adjusted to 2:1. In the case where the Al, Zn, and Mn contents of the AZ61 Mg alloy are 6 wt. %, 1 wt. %, and 0.28 wt. %, respectively, when the AZ61 Mg alloy content of the Mg-based raw material is 20 wt. % to 100 wt. %, the total amount of Al, Zn, and Mn in the $Mg_2Si$-based compound is 0.798 at % to 3.989 at %, y/x is 0.069, and z/x is 0.023.

When the AZ61 Mg alloy content of the Mg-based raw material is 50 wt. % to 100 wt. %, the total amount of Al, Zn, and Mn in the $Mg_2Si$-based compound is 1.98 at % to 3.99 at %.

TABLE 1

| AZ61 (wt. %) | | | | | | | |
|---|---|---|---|---|---|---|---|
| Al | Zn | Mn | Fe | Si | Cu | Ni | Mg |
| 5.5–7.2 | 0.5–1.5 | 0.15–0.40 | ≤0.01 | ≤0.10 | ≤0.10 | ≤0.005 | bal. |

When $Mg_{2-x-y-z}Al_xZn_yMn_zSi$ is produced from the AZ61 Mg alloy having a composition shown in Table 1, in the thus-produced $Mg_{2-x-y-z}Al_xZn_yMn_zSi$, x, y, and z satisfy the following relations: $0.029 \leq y/x \leq 0.11$ and $0.010 \leq z/x \leq 0.036$. In the $Mg_{2-x-y-z}Al_xZn_yMn_zSi$ produced from the AZ61 Mg alloy and Si powder, the total amount of Al, Zn, and Mn is 3.50 at % to 4.91 at %.

When $Mg_{2-x-y-z}Al_xZn_yMn_zSi$ is produced from a mixture of the AZ61 Mg alloy (20 wt. %) and Mg powder (80 wt. %), the total amount of Al, Zn, and Mn in the thus-produced $Mg_{2-x-y-z}Al_xZn_yMn_zSi$ is 0.70 at % to 0.97 at %. Therefore, when $Mg_{2-x-y-z}Al_xZn_yMn_zSi$ is produced from a mixture of the AZ61 Mg alloy (20 wt. % to 100 wt. %) and Mg powder (80 wt. % to 0 wt. %), the total amount of Al, Zn, and Mn in the thus-produced $Mg_{2-x-y-z}Al_xZn_yMn_zSi$ is 0.70 at % to 4.91 at %.

When $Mg_{2-x-y-z}Al_xZn_yMn_zSi$ is produced from a mixture of the AZ61 Mg alloy (50 wt. %) and Mg powder (50 wt. %), the total amount of Al, Zn, and Mn in the thus-produced $Mg_{2-x-y-z}Al_xZn_yMn_zSi$ is 1.74 at % to 2.43 at %. Therefore, when $Mg_{2-x-y-z}Al_xZn_yMn_zSi$ is produced from a mixture of the AZ61 Mg alloy (50 wt. % to 100 wt. %) and Mg powder (50 wt. % to 0 wt. %), the total amount of Al, Zn, and Mn in the thus-produced $Mg_{2-x-y-z}Al_xZn_yMn_zSi$ is 1.74 at % to 4.91 at %.

The above-prepared Mg—Si mixture was placed in an alumina crucible, and an $Mg_2Si$-based compound was synthesized through the liquid-solid phase reaction process in a stream of Ar under the following conditions: retention time: 1 h, retention temperature: 680° C. The minimum retention temperature may be the melting point of the material which forms the liquid phase (e.g., 610° C. in the case of the AZ61 Mg alloy), and the maximum retention temperature may be the lower of the boiling point of the material which forms the vapor phase (e.g., 1,107° C. in the case of the AZ61 Mg alloy) and the melting point of the thus-synthesize $Mg_2Si$-based compound (e.g., 1,102° C. in the case of $Mg_2Si$). The retention time, which may vary with the retention temperature, must be at least 30 minutes. Even when the retention time is longer than necessary, the $Mg_2Si$-based compound is synthesized without causing any problem. The $Mg_2Si$-based compound is synthesized at atmospheric pressure.

The thus-synthesized compound was crushed in an Ar atmosphere, and the thus-crushed compound was subjected to classification, to thereby form crushed powder having a particle diameter of 75 μm or less. Subsequently, the crushed powder was sintered and solidified by spark plasma sintering under vacuum under the following conditions: sintering temperature: 730° C., sintering pressure: 60 MPa, retention time: 30 min. Sintering was carried out by means of a graphite die (inner diameter: 20 mm) and a graphite punch (diameter: 20 mm). Formation of the crushed powder may be carried out in, in place of an Ar atmosphere, an atmosphere of an inert gas (e.g., He or Ne) or $N_2$ gas. The sintering temperature may be 650 to 900° C., the sintering pressure may be 30 to 100 MPa, and the retention time may be 10 min to 1 h.

Figure 3:
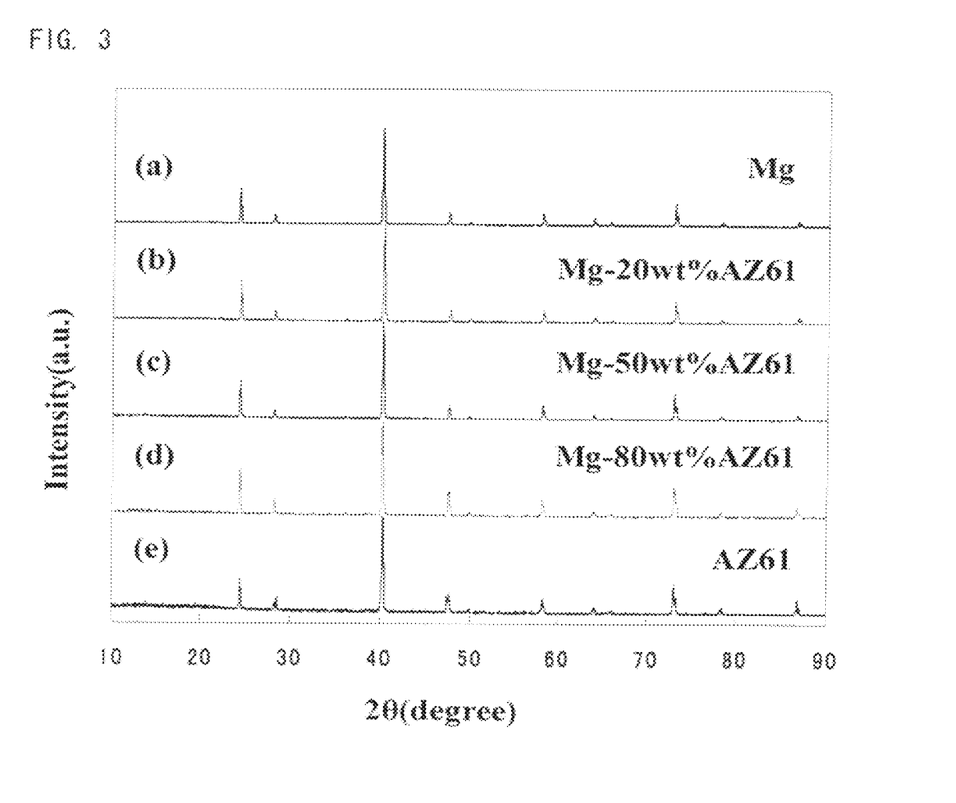
FIG. 3 is XRD charts of samples synthesized from Mg-based raw materials containing Mg and the AZ61 Mg alloy in different proportions.

FIG. 3 is XRD charts of powder samples obtained through particle size classification (by sieving) of $Mg_2Si$-based compounds synthesized by the liquid-solid phase reaction process from Mg-based raw materials containing pure Mg powder and cut chips of the AZ61 Mg alloy in different proportions. As shown in each of the XRD charts corresponding to different proportions of the raw materials, only a peak attributed to the $Mg_2Si$ phase is detected, and a peak attributed to a second phase is not detected. This indicates that $Mg_{2-x-y-z}Al_xZn_yMn_zSi$ compound semiconductors of uniform composition are produced.

(Thermoelectric Properties)

Figure 4:
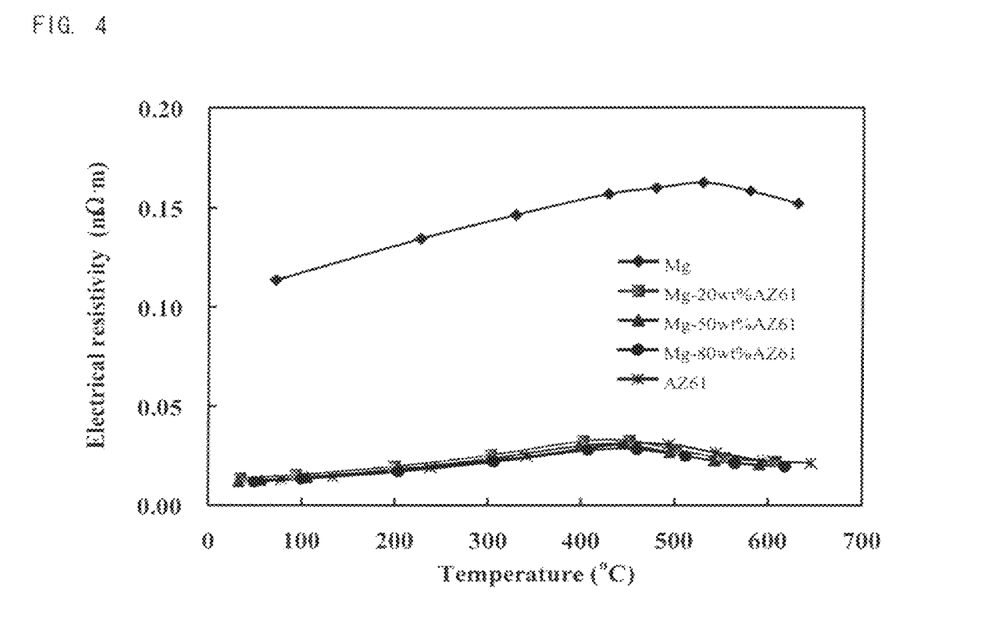
FIG. 4 is a graph showing the relationship between temperature and the electrical resistivity of samples synthesized from Mg-based raw materials containing Mg and the AZ61 Mg alloy in different proportions.

FIG. 4 is a graph showing the relationship between temperature and the electrical resistivity of samples obtained through sintering of $Mg_2Si$-based compounds synthesized by the liquid-solid phase reaction process from Mg-based raw materials containing pure Mg powder and cut chips of the AZ61 Mg alloy in different proportions. A sample obtained from an Mg-based raw material containing only pure Mg (i.e., not containing the AZ61 Mg alloy) exhibited a high electrical resistivity of 0.11 to 0.16 mΩ·m over the entire temperature range of measurement. In contrast, a sample obtained from an Mg-based raw material containing the AZ61 Mg alloy in an amount of 20 wt. % or more exhibited a low electrical resistivity of 0.013 to 0.032 mΩ·m over the entire temperature range of measurement. Such a low electrical resistivity is about 1/10 of the electrical resistivity of the sample obtained from the Si powder and the Mg-based raw material containing only pure Mg. Low electrical resistivity leads to improvement of thermoelectric performance.

Figure 5:
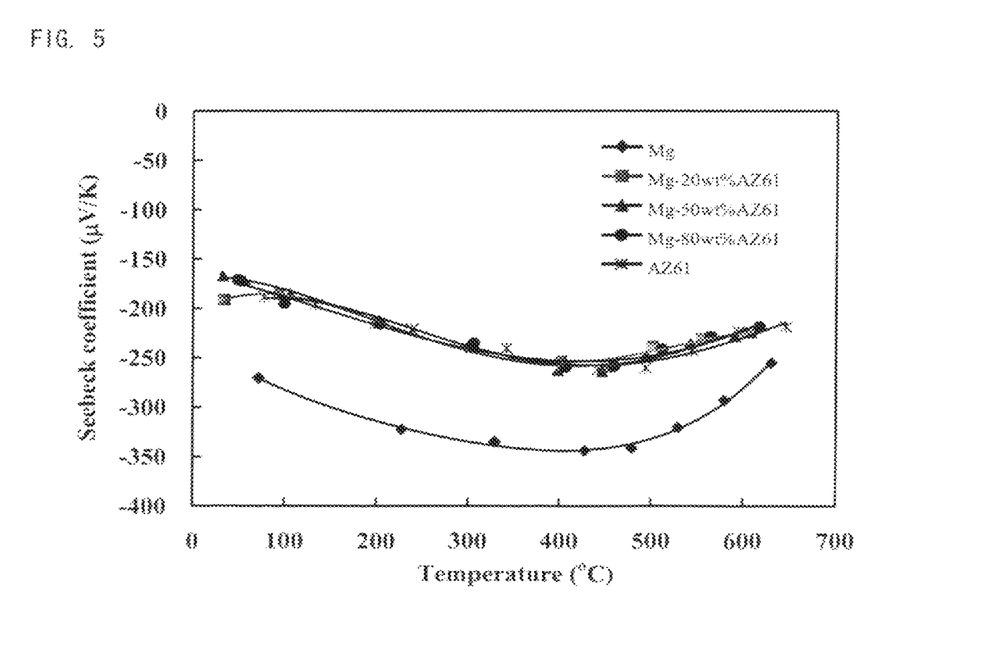
FIG. 5 is a graph showing the relationship between temperature and the Seebeck coefficient of samples synthesized from Mg-based raw materials containing Mg and the AZ61 Mg alloy in different proportions.

FIG. 5 is a graph showing the relationship between temperature and the Seebeck coefficient of samples obtained through sintering of $Mg_2Si$-based compounds synthesized by the liquid-solid phase reaction process from Mg-based raw materials containing pure Mg powder and cut chips of the AZ61 Mg alloy in different proportions. As is clear from this graph, each sample exhibits a negative Seebeck coefficient (i.e., a property of N-type thermoelectric semiconductor). In the case of a sample obtained from the $Mg_2Si$ compound not containing the AZ61 Mg alloy, the absolute value of Seebeck coefficient is high over the entire temperature range of measurement. In contrast, in the case of samples obtained from Mg-based raw materials containing the AZ61 Mg alloy in an amount of 20 wt. % or more, the absolute value of Seebeck coefficient becomes lower, and the Seebeck coefficient profiles of the samples are almost the same, regardless of the difference in proportion of the AZ61 Mg alloy among the samples.

Figure 6:
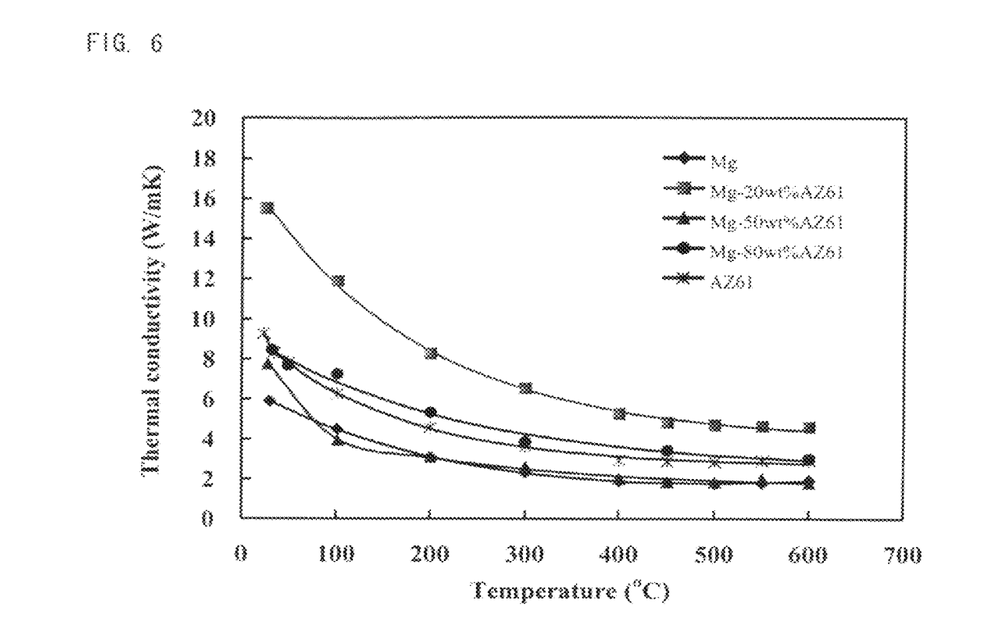
FIG. 6 is a graph showing the relationship between temperature and the thermal conductivity of samples synthesized from Mg-based raw materials containing Mg and the AZ61 Mg alloy in different proportions.

FIG. 6 is a graph showing the relationship between temperature and the thermal conductivity of samples obtained through sintering of $Mg_2Si$-based compounds synthesized by the liquid-solid phase reaction process from Mg-based raw materials containing pure Mg powder and cut chips of the AZ61 Mg alloy in different proportions. A sample obtained from an Mg-based raw material containing only pure Mg (i.e., not containing the AZ61 Mg alloy) exhibits a thermal conductivity almost equal to that of a sample obtained from an Mg-based raw material containing Mg in an amount of 50 wt. % and the AZ61 Mg alloy in an amount of 50 wt. %, and these samples exhibit similar relationship between temperature and thermal conductivity. In contrast, a sample obtained from an Mg-based raw material containing only the AZ61 Mg alloy tends to exhibit a thermal conductivity higher by about 1 W/m·K to about 2 W/m·K than that of these samples.

Figure 7:
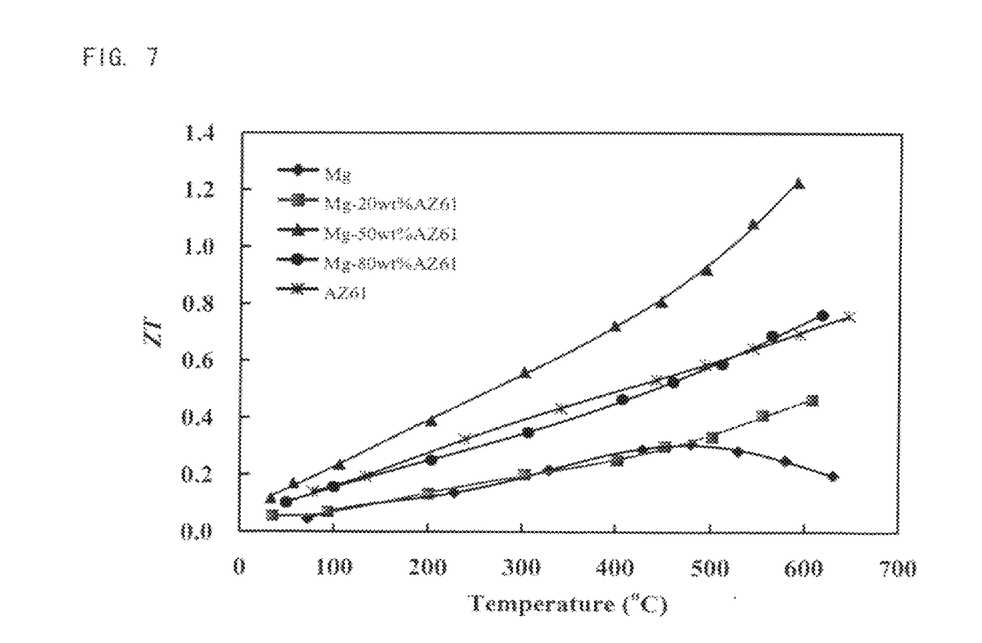
FIG. 7 is a graph showing the relationship between temperature and the dimensionless figure of merit (ZT) of samples synthesized from Mg-based raw materials containing Mg and the AZ61 Mg alloy in different proportions.

FIG. 7 is a graph showing the relationship between temperature and the dimensionless figure of merit (ZT) of samples obtained through sintering of $Mg_2Si$-based compounds synthesized by the liquid-solid phase reaction process from Mg-based raw materials containing pure Mg powder and cut chips of the AZ61 Mg alloy in different proportions. A compound obtained from an Mg-based raw material containing Mg powder in an amount of 50 wt. % and the AZ61 Mg alloy in an amount of 50 wt. % exhibited a dimensionless figure of merit (ZT) of 0.72 to 1.22 at 400 to 600° C. (maximum measurement temperature: 590° C.) and a ZT of 1.22 at 590° C. In contrast, $Mg_2Si$ produced from an Mg-based raw material containing only pure Mg (i.e., not containing the AZ61 Mg alloy) exhibited a ZT of 0.27 to 0.30 at 400 to 600° C. and a ZT of 0.30 at 500° C. As is clear from these data, the dimensionless figure of merit (ZT) of the compound of the present invention is about four times that of $Mg_2Si$. This considerable improvement of dimensionless figure of merit (ZT) of the compound of the present invention is attributed to the fact that the electrical resistivity of the compound is considerably lower than that of $Mg_2Si$, and the thermal conductivity is comparable to that of $Mg_2Si$, although the absolute value of Seebeck coefficient of the compound is lower than that of $Mg_2Si$.

A compound obtained from an Mg-based raw material containing only the AZ61 Mg alloy exhibited a dimensionless figure of merit (ZT) of 0.49 to 0.7 at 400 to 600° C. and a ZT of 0.7 at 600° C. The dimensionless figure of merit (ZT) of this compound is about twice that of $Mg_2Si$, but is about 4/7 of that of the compound synthesized from an Mg-based raw material containing Mg powder (50 wt. %) and the AZ61 Mg alloy (50 wt. %). The reason why the compound obtained from an Mg-based raw material containing only the AZ61 Mg alloy exhibits a dimensionless figure of merit (ZT) lower than that of the compound synthesized from an Mg-based raw material containing Mg powder (50 wt. %) and the AZ61 Mg alloy (50 wt. %) is that the thermal conductivity of the former compound is higher than that of the latter compound. A compound obtained from an Mg-based raw material containing Mg powder in an amount of 80 wt. % and the AZ61 Mg alloy in an amount of 20 wt. % exhibited a dimensionless figure of merit (ZT) of 0.25 to 0.46 at 400 to 600° C. and a ZT of 0.46 at 600° C. In a temperature range of 450° C. or lower, the profile of dimensionless figure of merit (ZT) of this compound is similar to that of the compound produced from an Mg-based raw material containing only pure Mg. A compound obtained from an Mg-based raw material containing Mg powder in an amount of 20 wt. % and the AZ61 Mg alloy in an amount of 80 wt. % exhibited a dimensionless figure of merit (ZT) of 0.46 to 0.74 at 400 to 600° C. and a ZT of 0.74 at 600° C. The profile of dimensionless figure of merit (ZT) of this compound is similar to that of the compound obtained from an Mg-based raw material containing only the AZ61 Mg alloy.

(Thermoelectric Performance in Air at High Temperature)

For evaluation of change in thermoelectric performance in air at high temperature, the sample obtained from an Mg-based raw material containing only pure Mg powder (i.e., not containing the AZ61 Mg alloy) and the sample obtained from an Mg-based raw material containing only cut chips of the AZ61 Mg alloy were retained in air at 500° C. for different periods of time, and the thus-retained samples were compared with each other in terms of change in power factor ($\alpha^2/\rho$:$\alpha$ represents Seebeck coefficient (V/K) and $\kappa$ represents electrical resistivity ($\Omega$m)), which is an index for evaluation of thermoelectric performance. Specifically, each sample was retained in air at 500° C. for a specific period of time, and then the electrical resistivity and Seebeck coefficient of the sample were measured, followed by determination of the power factor of the sample from the thus-measured values. Thereafter, the sample was again retained in air at 500° C. for a specific period of time, and then the electrical resistivity and Seebeck coefficient of the sample were measured. This operation was carried out repeatedly for evaluation of change in power factor with respect to retention time.

Figure 8:
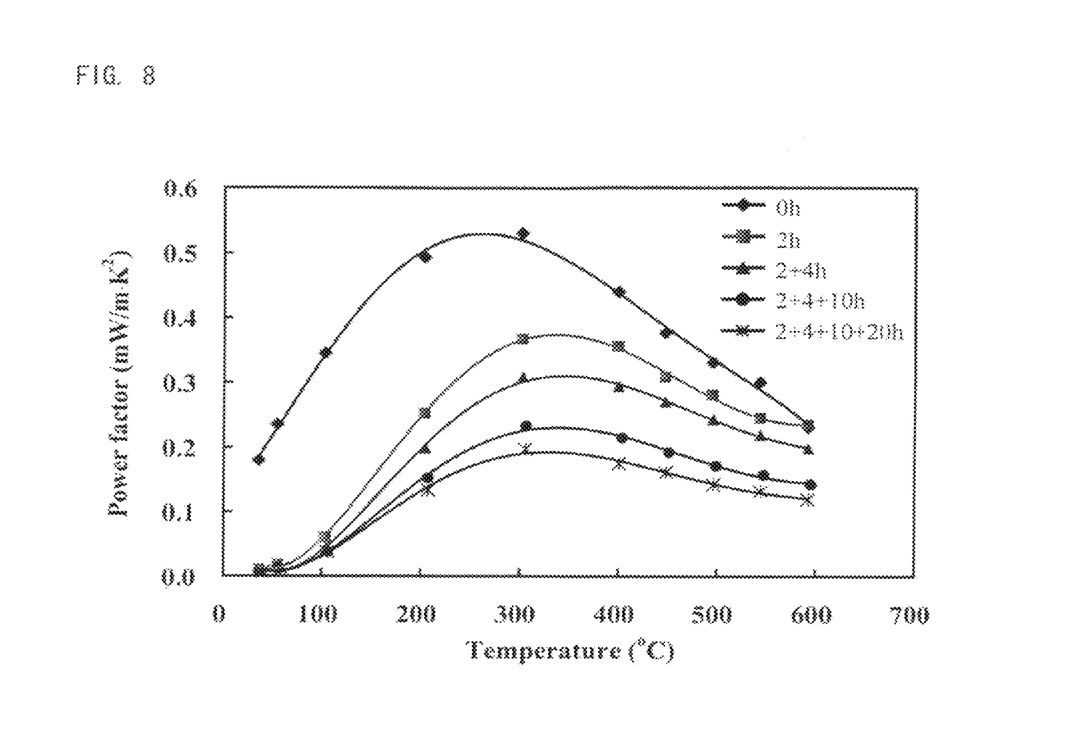
FIG. 8 is graph showing the relationship between temperature and the power factor of a sample synthesized from an Mg-based raw material containing only Mg with a retention time in air at 500° C. as parameter.

FIG. 8 is graph showing the relationship between temperature and the power factor of the sample synthesized from an Mg-based raw material containing only Mg with a retention time in air at 500° C. as parameter. As shown in this figure, the longer the retention time, the lower the thermoelectric performance of the sample; i.e., the $Mg_2Si$ compound semiconductor has low oxidation resistance.

Figure 9:
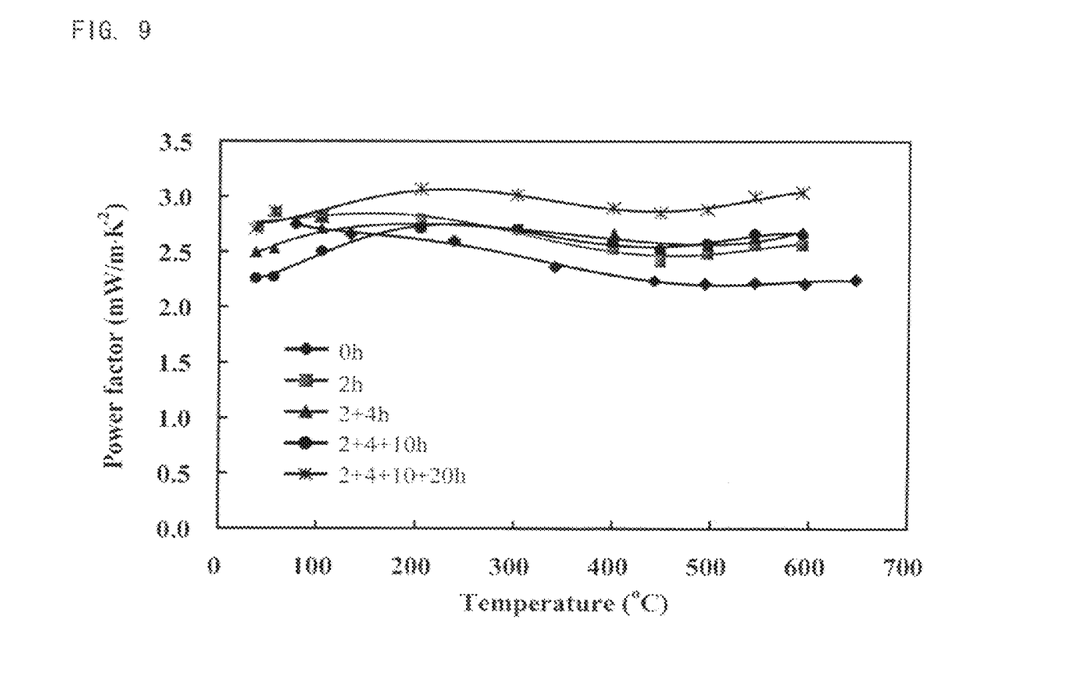
FIG. 9 is graph showing the relationship between temperature and the power factor of a sample synthesized from an Mg-based raw material containing only the AZ61 Mg alloy with a retention time in air at 500° C. as parameter.

FIG. 9 is graph showing the relationship between temperature and the power factor of the sample synthesized from an Mg-based raw material containing only the AZ61 alloy with a retention time in air at 500° C. as parameter. In contrast to the case of the $Mg_2Si$ sample synthesized from an Mg-based raw material containing only Mg, no pronounced deterioration of thermoelectric performance occurs even when retained for a prolonged period of time. Thus, employment of an Mg alloy such as AZ61 for synthesis of an $Mg_2Si$-based compound is envisaged to prevent deterioration of the thermoelectric performance of the compound in air at high temperature. Rather, when the thus-produced $Mg_{2-x-y-z}Al_xZn_yMn_zSi$ was thermally treated, the power factor of the $Mg_{2-x-y-z}Al_xZn_yMn_zSi$ tended to increase. This fact indicates that thermal treatment after production of the $Mg_2Si$-based compound is effective.

Example 2

Figure 10:
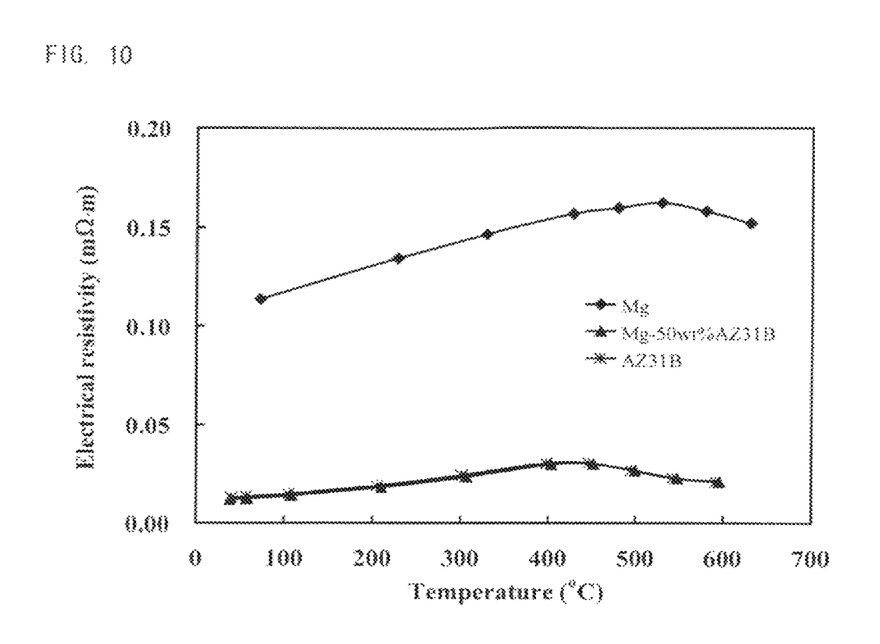
FIG. 10 is a graph showing the relationship between temperature and the electrical resistivity of samples synthesized from Mg-based raw materials containing Mg and an AZ31B Mg alloy in different proportions.
Figure 11:
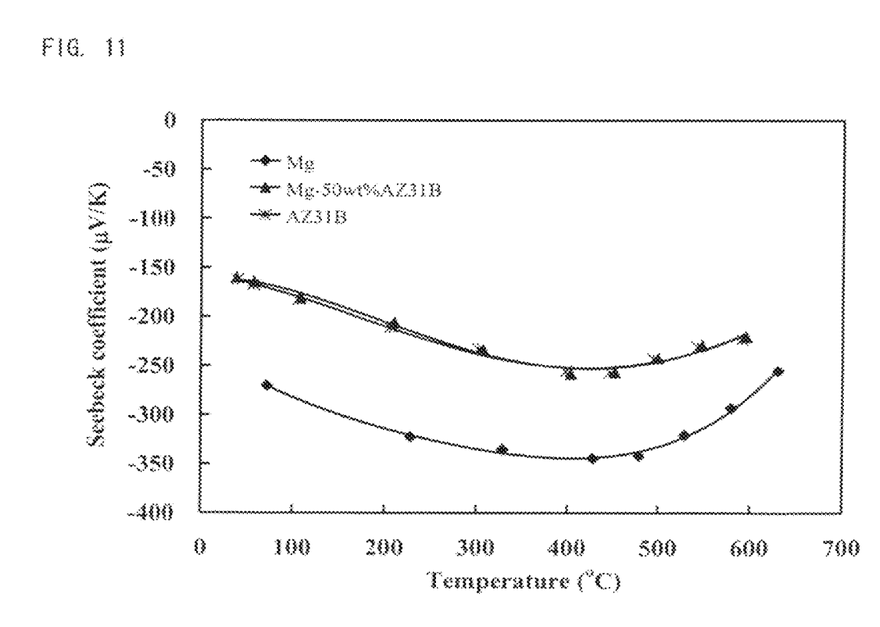
FIG. 11 is a graph showing the relationship between temperature and the Seebeck coefficient of samples synthesized from Mg-based raw materials containing Mg and the AZ31B Mg alloy in different proportions.
Figure 12:
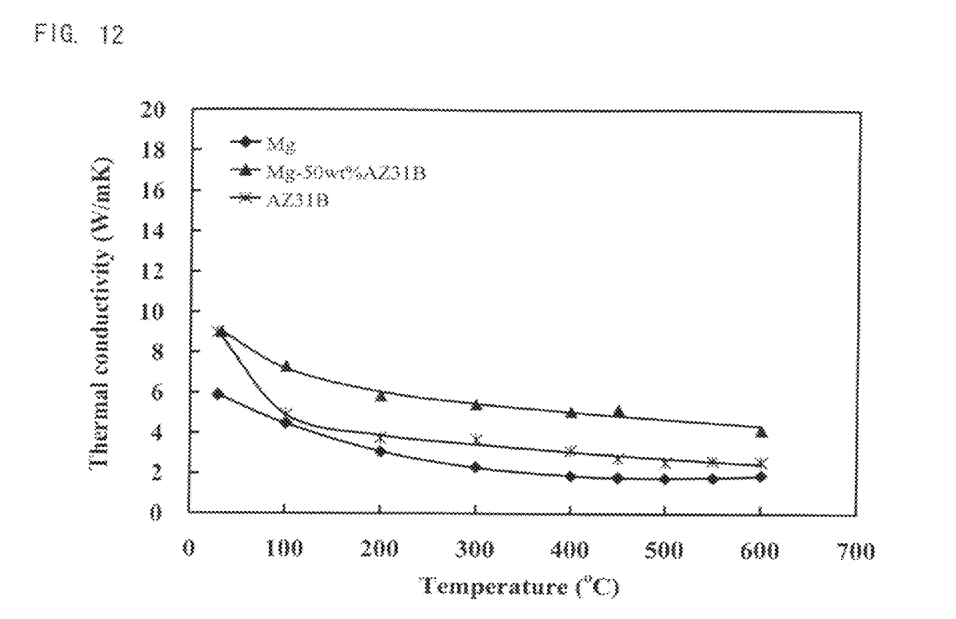
FIG. 12 is a graph showing the relationship between temperature and the thermal conductivity of samples synthesized from Mg-based raw materials containing Mg and the AZ31B Mg alloy in different proportions.
Figure 13:
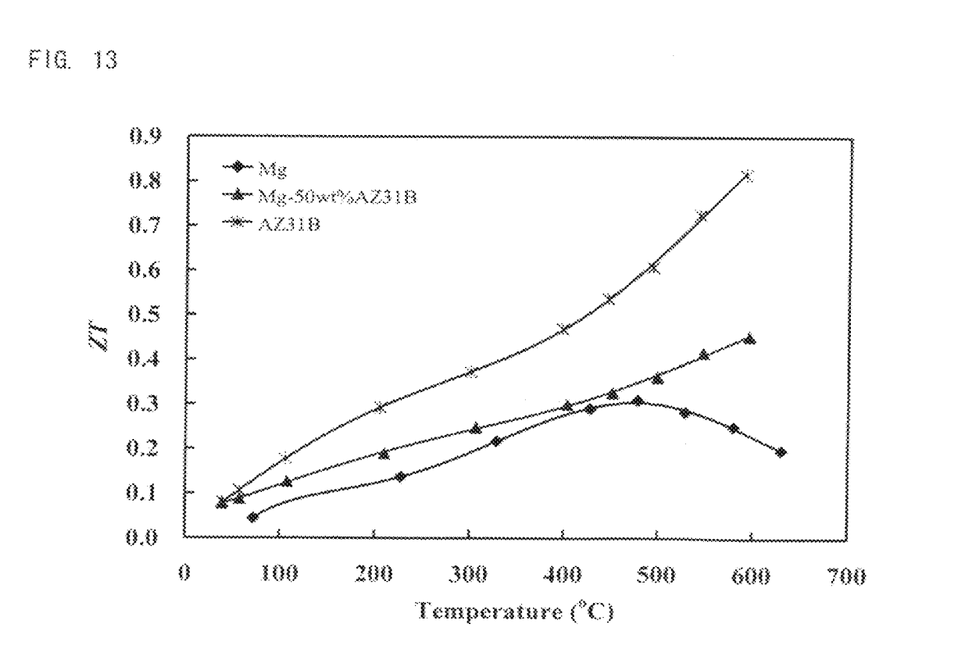
FIG. 13 is a graph showing the relationship between temperature and the dimensionless figure of merit (ZT) of samples synthesized from Mg-based raw materials containing Mg and the AZ31B Mg alloy in different proportions.

In a manner similar to that of Example 1, $Mg_{2-x-y-z}Al_xZn_yMn_zSi$ compounds of different compositions were produced by allowing Si powder to react with the following Mg-based raw materials: an Mg-based raw material containing only an AZ31B alloy having a composition described in Table 2 shown below, and an Mg-based raw material prepared by mixing the AZ31B alloy (50 wt. %) with Mg powder (50 wt. %) so as to adjust the concentration of each component. FIG. 10 shows the relationship between temperature and electrical resistivity; FIG. 11 shows the relationship between temperature and Seebeck coefficient; FIG. 12 shows the relationship between temperature and thermal conductivity; and FIG. 13 shows the relationship between temperature and dimensionless figure of merit. The relationship between temperature and electrical resistivity or Seebeck coefficient was the same as that in the case where an Mg-based raw material containing only the AZ61 alloy or containing a mixture of the AZ61 alloy (50 wt. %) and Mg powder (50 wt. %) was employed in Example 1. An $Mg_{2-x-y-z}Al_xZn_yMn_zSi$ compound produced from an Mg-based raw material containing the AZ31B Mg alloy (100 wt. %) exhibited a dimensionless figure of merit of 0.47 to 0.81 at 400 to 600° C. (maximum measurement temperature: 590° C.). The dimensionless figure of merit of this compound is 1.7 to 2.7 times that of $Mg_2Si$ (i.e., 0.27 to 0.30).

TABLE 2

| AZ31B (wt. %) | | | | | | | | |
|---|---|---|---|---|---|---|---|---|
| Al | Zn | Mn | Fe | Si | Cu | Ni | Ca | Mg |
| 2.5-3.5 | 0.6-1.4 | 0.20-1.0 | ≤0.005 | ≤0.10 | ≤0.05 | ≤0.005 | ≤0.04 | bal. |

Figure 14:
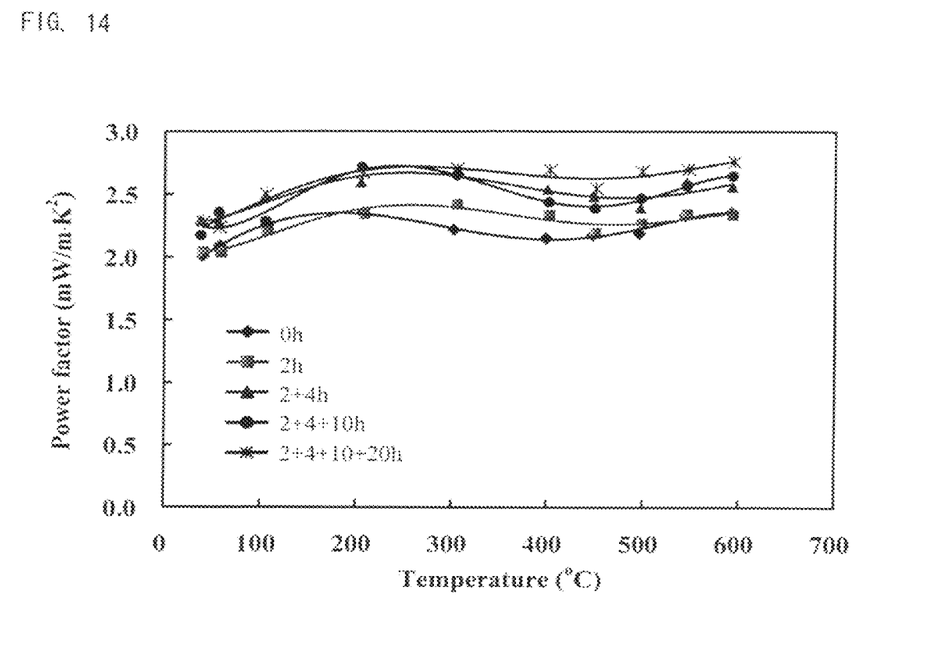
FIG. 14 is graph showing the relationship between temperature and the power factor of a sample synthesized from an Mg-based raw material containing only the AZ31B Mg alloy with a retention time in air at 500° C. as parameter.

In a manner similar to that in Example 1, the sample of Example 2 was retained in air at 500° C. for a specific period of time, and then the electrical resistivity and Seebeck coefficient of the sample were measured, followed by determination of the power factor of the sample from the thus-measured values. FIG. 14 is graph showing the relationship between temperature and the power factor of the sample with a retention time in air at 500° C. as parameter. As is clear from FIG. 14, similar to the case of Example 1, employment of the AZ31B Mg alloy for synthesis of an $Mg_2Si$-based compound is envisaged to prevent deterioration of the thermoelectric performance of the compound in air at high temperature. Also, similar to the case of Example 1, when the above-produced $Mg_{2-x-y-z}Al_xZn_yMn_zSi$ was thermally treated, the power factor of the $Mg_{2-x-y-z}Al_xZn_yMn_zSi$ tended to increase. This fact indicates that when a semiconductor produced from the AZ31B Mg alloy is thermally treated, the thus-treated semiconductor exhibits improved thermoelectric performance.

When $Mg_{2-x-y-z}Al_xZn_yMn_zSi$ is produced from the AZ31B Mg alloy having a composition shown in Table 2, in the thus-produced $Mg_{2-x-y-z}Al_xZn_yMn_zSi$, x, y, and z satisfy the following relations: $0.071 \leq y/x \leq 0.23$ and $0.028 \leq z/x \leq 0.20$. In the $Mg_{2-x-y-z}Al_xZn_yMn_zSi$ produced from the AZ31B Mg alloy and Si powder, the total amount of Al, Zn, and Mn is 1.72 at % to 2.79 at %.

$Mg_{66}Al_{0.33}Zn_{0.33}Si_{33.33}$ disclosed in Japanese Patent Application Laid-Open (kokai) No. 2006-128235 exhibits, at a temperature of 400 to 600° C., a dimensionless figure of merit (ZT) almost equal to that of $Mg_2Si$ (i.e., only slightly higher by about 0.1 than that of $Mg_2Si$). In contrast, the compound of Example 1 or 2 respectively exhibits a dimensionless figure of merit (ZT) about four or three times that of $Mg_2Si$ or $Mg_{66}Al_{0.33}Zn_{0.33}Si_{33.33}$.

Figure 15:
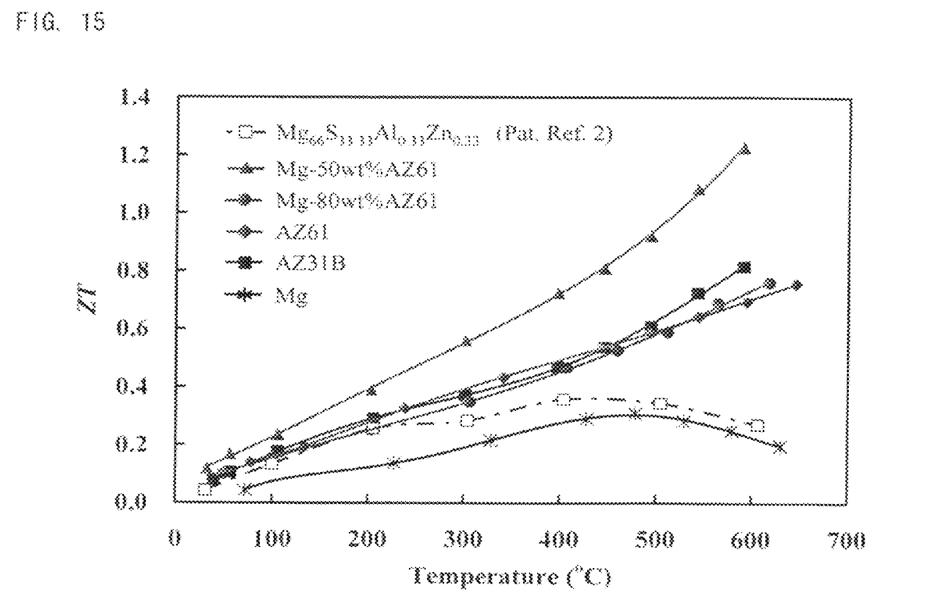
FIG. 15 is a graph showing the relationship between temperature and the dimensionless figure of merit (ZT) of representative samples synthesized from Mg-based raw materials containing Mg and the AZ61 Mg alloy or the AZ31B Mg alloy in different proportions.

FIG. 15 collectively shows the dimensionless figures of merit (ZT) of samples of Examples 1 and 2 exhibiting favorable results, and those of $Mg_2Si$ and $Mg_{66}Al_{0.33}Zn_{0.33}Si_{33.33}$ disclosed in Japanese Patent Application Laid-Open (kokai) No. 2006-128235. As is clear from the data of Examples 1 and 2, $Mg_{2-x-y-z}Al_xZn_yMn_zSi$ produced from an Mg-based material containing the AZ61 Mg alloy in an amount of 50 wt. % or more or containing the AZ31B Mg alloy in an amount of 100 wt. % exhibits a dimensionless figure of merit higher than that of a conventional $Mg_2Si$-based compound. Thus, in the $Mg_{2-x-y-z}Al_xZn_yMn_2Si$ exhibiting a dimensionless figure of merit higher than that of a conventional $Mg_2Si$-based compound, the total amount of Al, Zn, and Mn is 1.72 at % to 4.91 at %, and x, y, and z satisfy the following relations: $0.029 \leq y/x \leq 0.23$ and $0.010 \leq z/x \leq 0.20$.

The $Mg_2Si$-based compound of the present invention is very useful as a thermoelectric material.

What is claimed is:

1. A thermoelectric material essentially formed of an $Mg_2Si$-based compound represented by the chemical formula $Mg_{2-x-y-z}Al_xZn_yMn_zSi$ ($x \neq 0$, $y \neq 0$, $z \neq 0$) wherein the total amount of Al, Zn, and Mn is 0.3 at % to 5 at %.

2. A thermoelectric material according to claim 1, wherein x, y, and z of the chemical formula satisfy the following relations: $0.04 \leq y/x \leq 0.6$ and $0.013 \leq z/x \leq 0.075$.

3. A thermoelectric material according to claim 1, wherein $Mg_{2-x-y-z}Al_xZn_yMn_z$ which forms the compound with Si is provided in the form of an Mg alloy.

4. A thermoelectric material according to claim 2, wherein $Mg_{2-x-y-z}Al_xZn_yMn_z$ which forms the compound with Si is provided in the form of an Mg alloy.

* * * * *